US008799427B2

(12) United States Patent
Sankaran (10) Patent No.: US 8,799,427 B2
(45) Date of Patent: Aug. 5, 2014

(54) APPARATUS AND METHOD FOR SHARING A GENERIC CONFIGURATION ACROSS A GROUP OF NETWORK DEVICES (71) Applicant: Cisco Technology, Inc., San Jose, CA (US)

(72) Inventor: Ganesh Chennimalai Sankaran, Chennai (IN)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/032,281

(22) Filed: Sep. 20, 2013

(65) Prior Publication Data
US 2014/0019600 A1  Jan. 16, 2014

Related U.S. Application Data (63) Continuation of application No. 12/186,954, filed on Aug. 6, 2008, now Pat. No. 8,554,883.

(51) Int. Cl.
G06F 15/173 (2006.01)
H04L 12/24 (2006.01)

(52) U.S. Cl.
CPC ......... H04L 41/0813 (2013.01); H04L 41/0889 (2013.01); H04L 41/0869 (2013.01)
USPC ............................ 709/221; 709/245; 370/328

(58) Field of Classification Search
USPC .......................................................... 709/221
See application file for complete search history.

(56) References Cited

U.S. PATENT DOCUMENTS

| 5,625,621 | A  | * | 4/1997  | Christensen et al. ......... 370/248 |
| 2002/0161865 | A1 | * | 10/2002 | Nguyen ........................ 709/220 |
| 2002/0161867 | A1 | * | 10/2002 | Cochran et al. ............... 709/221 |
| 2002/0178380 | A1 | * | 11/2002 | Wolf et al. .................... 713/201 |
| 2004/0123091 | A1 | * | 6/2004  | Das ................................... 713/2 |
| 2004/0166891 | A1 | * | 8/2004  | Mahkonen et al. ......... 455/550.1 |
| 2004/0243603 | A1 | * | 12/2004 | Komatsu ....................... 707/100 |
| 2006/0007944 | A1 | * | 1/2006  | Movassaghi et al. ......... 370/401 |
| 2006/0047793 | A1 | * | 3/2006  | Agrawal et al. ............... 709/221 |
| 2006/0168158 | A1 | * | 7/2006  | Das ................................ 709/220 |
| 2006/0209714 | A1 | * | 9/2006  | Ackermann-Markes et al. ............................. 370/254 |
| 2006/0268770 | A1 | * | 11/2006 | Spiess .......................... 370/328 |
| 2007/0113273 | A1 | * | 5/2007  | Shafer et al. .................... 726/11 |
| 2007/0268506 | A1 | * | 11/2007 | Zeldin ......................... 358/1.13 |
| 2007/0268515 | A1 | * | 11/2007 | Freund et al. ................ 358/1.15 |
| 2007/0268516 | A1 | * | 11/2007 | Bugwadia et al. ........... 358/1.15 |
| 2008/0126306 | A1 | * | 5/2008  | Corona ............................. 707/3 |

(Continued)

OTHER PUBLICATIONS

"U.S. Appl. No. 12/186,954 , Response filed May 29, 2012 to Final Office Action mailed Dec. 29, 2011", 13 pgs.

(Continued)

Primary Examiner — Hamza Algibhah
(74) Attorney, Agent, or Firm — Schwegman Lundberg & Woessner, P.A.

(57) ABSTRACT

Various embodiments provide an apparatus and method for sharing a generic configuration across a group of network devices. An example embodiment includes sending a scope challenge to a plurality of network devices; receiving a response to the scope challenge from a plurality of in-scope network devices; sending a configuration change message including a configuration change to the plurality of in-scope network devices; and receiving a commit message from the plurality of in-cope network devices indicating that the configuration change has been committed.

18 Claims, 8 Drawing Sheets

(56) References Cited

U.S. PATENT DOCUMENTS

| | | | |
|---|---|---|---|
| 2008/0130517 A1* | 6/2008 | Lee et al. | 370/254 |
| 2008/0172481 A1* | 7/2008 | Chung et al. | 709/222 |
| 2009/0019422 A1* | 1/2009 | Loughlin et al. | 717/106 |
| 2009/0049196 A1* | 2/2009 | Smith et al. | 709/245 |
| 2010/0011094 A1 | 1/2010 | Ver Steeg et al. | |
| 2010/0036911 A1 | 2/2010 | Sankaran | |
| 2010/0131633 A1 | 5/2010 | Herlein et al. | |

OTHER PUBLICATIONS

"U.S. Appl. No. 12/186,954, Final Office Action mailed Jan. 7, 2011", 16 pgs.

"U.S. Appl. No. 12/186,954, Final Office Action mailed Dec. 29, 2011", 19 pgs.

"U.S. Appl. No. 12/186,954, Non Final Office Action mailed Sep. 14, 2012", 21 pgs.

"U.S. Appl. No. 12/186,954, Non Final Office Action mailed Jul. 7, 2011", 18 pgs.

"U.S. Appl. No. 12/186,954, Non-Final Office Action mailed Jun. 7, 2010", 14 pgs.

"U.S. Appl. No. 12/186,954, Notice of Allowance mailed Jun. 7, 2013", 8 pgs.

"U.S. Appl. No. 12/186,954, Response filed Feb. 14, 2013 to Non Final Office Action mailed Sep. 14, 2012", 17 pgs.

"U.S. Appl. No. 12/186,954, Response filed May 9, 2011 to Final Office Action mailed Jan. 7, 2011", 10 pgs.

"U.S. Appl. No. 12/186,954, Response filed Oct. 6, 2010 to Non Final Office Action mailed Jul. 7, 2010", 12 pgs.

\* cited by examiner

APPARATUS AND METHOD FOR SHARING A GENERIC CONFIGURATION ACROSS A GROUP OF NETWORK DEVICES

CLAIM OF PRIORITY

This application claims the benefit of priority to U.S. patent application Ser. No. 12/186,954, filed Aug. 6, 2008, which is hereby incorporated by reference herein in its entirety.

FIELD

The disclosed subject matter relates to the field of data processing devices, and more particularly to networked data processing devices.

BACKGROUND

Configuration errors are viewed as a single big source of unintended distributed network behavior. There are several neighbor device negotiation protocols defined and already available. These well-known protocols include the auto-negotiation protocol defined as part of IEEE 802.1u and Cisco's Dynamic Inter-Switch Link Protocol (DISL) or Dynamic Trunking Protocol (DTP). Similarly, multi-device configuration protocols like Cisco's Virtual Local Area Network Trunking Protocol (VTP) and IEEE's 802.1s Multiple Spanning Tree (MST) protocol provide an implementation whereby a set of devices belonging to a domain/region pick up a configuration change that is done on one of the devices.

These protocols are specific in nature and do not cover all possible configurations across neighbor devices or, in general, a sub-set of the network. Specific negotiation and configuration protocols are available, but, a generic scoping, negotiation, and configuration mechanism is not available.

DESCRIPTION OF EXAMPLE EMBODIMENTS

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

Overview

An example embodiment includes sending a scope challenge to a plurality of network devices; receiving a response to the scope challenge from a plurality of in-scope network devices; sending a configuration change message including a configuration change to the plurality of in-scope network devices; and receiving a commit message from the plurality of in-scope network devices indicating that the configuration change has been committed.

Example Embodiments

As described further below, according to various example embodiments, there is provided an apparatus and method for sharing a generic configuration across a group of network devices. An example embodiment is described wherein configuration changes are rolled out to affected devices automatically. The described example embodiments may reduce the amount of time consumed for getting to the new configuration. Further, the described embodiments may reduce configuration problems across devices to a great extent and thus reduce mis-configurations across devices.

The example embodiments described herein first define a scope within a particular network having a plurality of interconnected network devices. These network devices can be any type of computing or processing device that can be configured, such as a computer, client device, server, router, gateway, switch, or the like. A scope can be any set of conditions, states, modes, configuration, or situations that can be defined in terms of a set of parameters, rules, deterministic functions, or the like (generally denoted conditions). In a particular example embodiment, a network device is presented with a set of conditions for evaluation and/or comparison. Upon evaluation of the set of conditions, the network device can determine if the conditions are met or not met. If the conditions are met, the network device can be considered within the scope of the defined conditions. Otherwise, the network device is considered outside the scope of the defined conditions. This scope can be used for configuration purposes across the network devices of an entire network by conveying a new network device configuration to the network devices that fall within the scope as determined by the defined conditions. The network devices within the scope apply the new configuration. The network devices outside the scope typically do not receive the new configuration and, in any case, do not apply the new configuration. In this manner, a particular configuration or configuration change can be specifically targeted to particular network devices of an entire network and automatically applied uniformly and nearly simultaneously.

As provided by the various embodiments described herein, a multi-device configuration context can be provided, much like an interface context or routing protocol context. The multi-device configuration context can be provided through management interfaces like a command line interface, Simple Network Management Protocol (SNMP), or other means. Any configurations in the multi-device context can make use of a corresponding scope. Some of the network devices of the multi-device context that are within the scope can be configured or reconfigured directly. Other devices falling within the scope of a configuration change can be automatically addressed either implicitly or explicitly to change the configuration. Upon receipt of a configuration change, the network devices within the defined scope can change the configuration of the network device and acknowledge the configuration change. In a particular embodiment, a two-way configuration change process can be used. In this example method, a first stage is used for conveying configuration information to the network device being configured and for the network device to acknowledge receipt of the configuration information. In a second stage, the network device commits the configuration.

Figure 1:
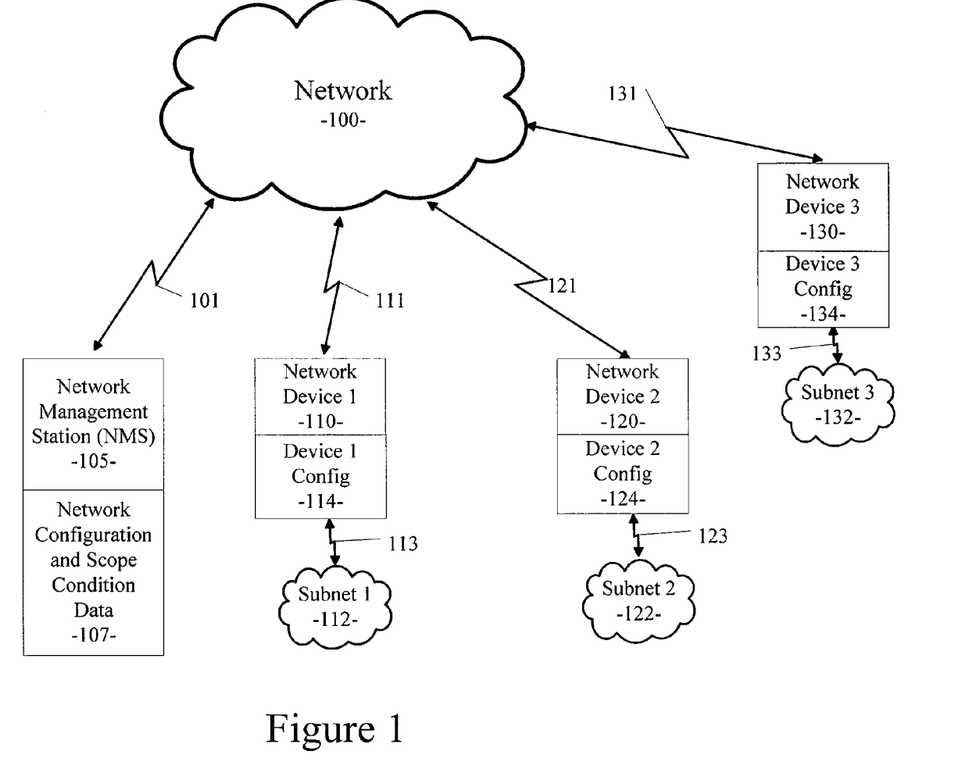
FIG. 1 illustrates an example network of a particular embodiment having several network devices including a network management server in communication with each other via a conventional network, such as the Internet.

FIG. 1 illustrates an example network having several network devices including a network management server (NMS) 105 and several network devices 110, 120, and 130 in communication with NMS 105 and with each other via communication paths 101, 111, 121, and 131 to/from a conventional network 100, such as the Internet. The NMS 105 is responsible for pushing configuration changes to the various network devices in the network. Each network device 110, 120, or 130 can be a computer, client device, server, router, gateway, switch, or the like. As such, the network devices 110, 120, or 130 can be further connected via communication paths 113, 123, and 133 to other network devices via subnets 112, 122, or 132 or connected to other network devices via network 100. Typically, each network device 110, 120, or 130 has an associated configuration defined by the various settings, parameters, modes, states, or conditions existing within the device at a particular time. This configuration for each network device is represented in FIG. 1 as device config 114, 124, and 134 associated with network devices 110, 120, and 130, respectively. NMS 105 can be responsible for managing the configuration of each of the network devices of a particular network, such as network devices 110, 120, and 130. As part of this network device configuration management function performed by the NMS 105, the NMS 105 maintains a set of network device configuration and scope condition data 107. Network device configuration and scope condition data 107 includes information indicative of the current and desired configuration for each of the network devices being managed by the NMS 105. Further, the network device configuration and scope condition data 107 includes information defining a plurality of scopes associated with a plurality of configurations maintained for each of the network devices being managed by the NMS 105. In this manner, the NMS 105 can implement a particular configuration or configuration change across a group of network devices, the particular configured or re-configured devices being identified by the associated scope. Each of the plurality of scopes retained in the network device configuration and scope condition data 107 can be defined by a set of conditions associated with each scope. As described above, the set of conditions can be used by a network device for evaluation and/or comparison. Upon evaluation of the set of conditions, the network device can determine if the conditions are met or not met. If the conditions are met, the network device can be considered within the scope of the defined conditions. Otherwise, the network device is considered outside the scope of the defined conditions. In a particular example embodiment described in more detail below, the NMS 105 can manage the configuration of each of the network devices within a defined scope of a particular network.

Figure 2:
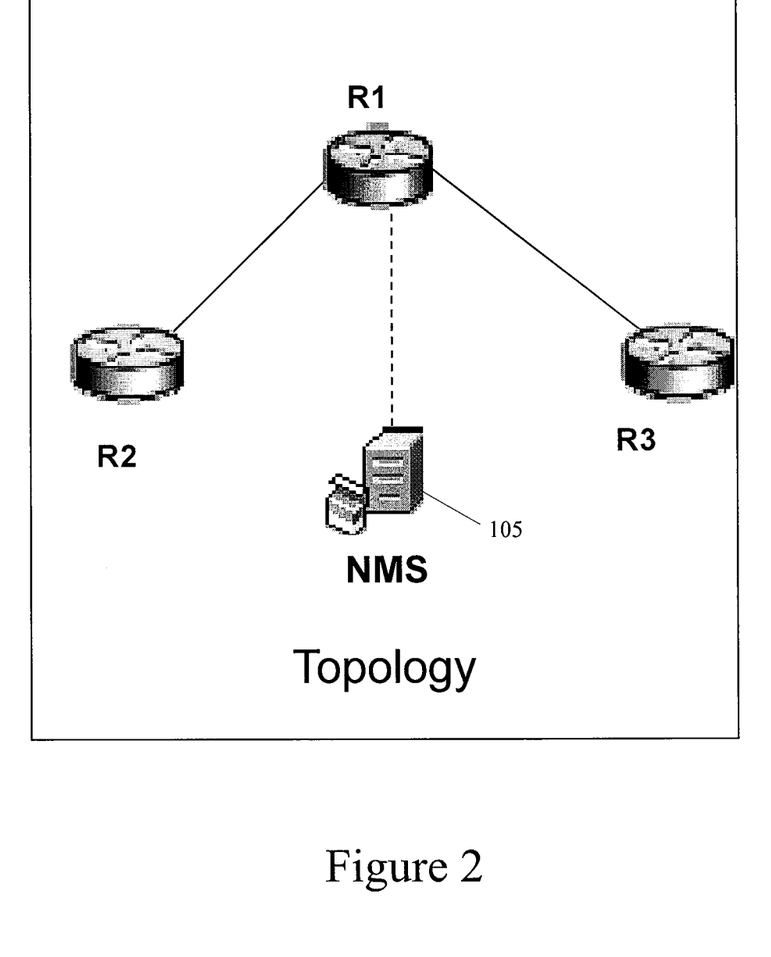
FIG. 2 illustrates a topology for a particular example network.

Referring now to FIG. 2, a topology for a particular example network is shown. As shown in FIG. 2, the NMS 105 may not be directly connected to each network device for which the NMS 105 is responsible for managing the configuration. As shown in FIG. 2, NMS 105 may need to convey a configuration change to network devices R2 and R3 via network device R1. As such, a particular configuration change may be conveyed in a hierarchical fashion in a particular example embodiment. Further, NMS 105 may not be aware of all of the network devices connected in a particular network topology. Nevertheless, a network configuration change may still be applicable to the unknown devices. As described in more detail below, a particular embodiment can determine the identities of the network devices that fall with a defined scope and then can target those devices within scope the for a configuration change for any network topology.

Figure 3:
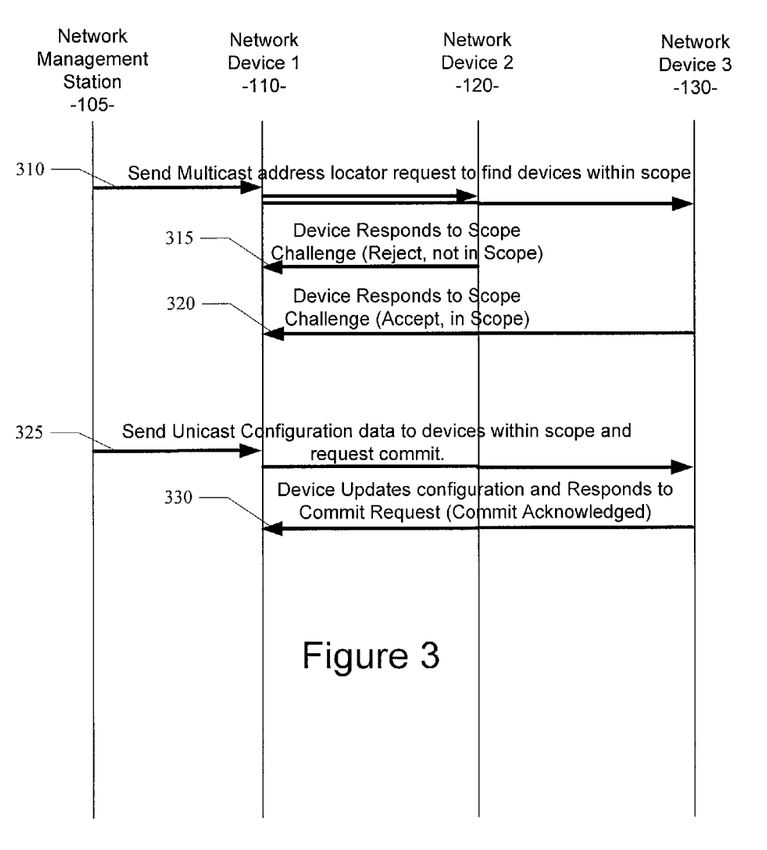
FIG. 3 is a sequence diagram illustrating a series of operations performed in an example embodiment for determining the identities of the network devices that fall within a defined scope and then targeting those devices for a configuration change.

Referring now to FIG. 3, a sequence diagram illustrates a series of operations performed in an example embodiment for determining the identities of the network devices that fall with a defined scope and for then targeting those devices for a configuration change. In the example of a particular embodiment shown in FIG. 3, the NMS 105 is communicating directly with a first network device 110 and communicating indirectly with a second network device 120 and a third network device 130 via the first network device 110. The example communication sequence shown in FIG. 3 corresponds with the network topology shown in FIG. 2. However, it will be apparent to those of ordinary skill in the art that the communication sequence shown in the example of FIG. 3 can be applied to any particular network topology using the systems and methods described herein.

Referring still to FIG. 3, NMS 105 is being used to push a configuration change to a group of network devices in an arbitrary topology. The configuration change can be represented by a set of configuration data that each network device can use to configure itself, thereby conforming to the configuration change communicated by the NMS 105. In a first phase of the configuration change, the NMS 105 multicasts an address locator request message 310 to all network devices. As shown in the example of FIG. 3, this first multicast message can be sent directly to network device 110, which then forwards the multicast message to other connected network devices, such as network devices 120 and 130. In other embodiments, NMS 105 can multicast directly to all network devices or multicast to a set of network devices using varying levels of indirection. In each case, all network devices can receive the multicast message sent from NMS 105. The purpose of the multicast message in the first phase of the configuration change is to determine the identity of network devices that are within the scope of the corresponding configuration change. As described above, in the first multicast message the NMS 105 can send to the network devices a set of conditions that each network device can evaluate. This set of conditions (also called a scope challenge) can be deterministically resolved to produce a result. The result can be used to determine if the particular network device is within (or outside) the scope of the configuration change. Once each network device evaluates the conditions of the scope challenge and determines if the network device is within or outside of the scope, each network device can send a unicast message back to the NMS 105, via one or more intervening network devices. The unicast message to the NMS 105 can either acknowledge that the network device is within scope or the network device can deny the scope challenge. In an alternative embodiment, only in-scope network devices can send an acknowledgement message back to the NMS 105. The unicast message to the NMS 105 can also include the identity of the network device reporting the result of the scope challenge. As a result, the NMS 105 will receive communications from each of the network devices (or only in-scope network devices) along with the identity and result of the scope challenge for each network device. As shown in the example of FIG. 3, network device 120 has responded to the scope challenge with a message 315 to NMS 105 via network device 110 identifying network device 120 and indicating that the network device 120 is not within the scope of the configuration change based on the evaluation of the scope conditions performed by network device 120. In contrast, network device 130 has responded to the scope challenge with a message 320 to NMS 105 via network device 110 identifying network device 130 and indicating that the network device 130 is within the scope of the configuration change based on the evaluation of the scope conditions performed by network device 130. At the end of the first phase of the configuration change, the NMS 105 can record the identity and result of the scope challenge for each network device. The NMS 105 can also define and record the identities of each network device in the set of all network devices that are within the scope of a particular configuration change. This set of network devices can be denoted as the in-scope network devices.

Once the NMS 105 defines the set of in-scope network devices, the NMS 105 can initiate a second phase of the configuration change. In the second phase, the NMS 105 generates a targeted unicast message 325 that targets only the network devices of the in-scope set. As such, network devices that are not within scope will not receive and process the targeted message. As described above, the NMS 105 can unicast directly to all in-scope network devices or multicast to the set of in-scope network devices using varying levels of indirection. The targeted message in the second phase of the configuration change contains the configuration change data that the in-scope network devices will use to reconfigure themselves. The targeted message 325 will also request each network device to commit to the configuration change. Once each in-scope network device receives and applies the configuration change embodied in the data of the targeted message, each in-scope network device can send a message 330 back to the NMS 105 via intervening network devices. Message 330 from each in-scope network device can acknowledge to the NMS 105 that the configuration change has been committed. In this manner, the NMS 105 can push a configuration change to a targeted set of network devices.

Figure 4:
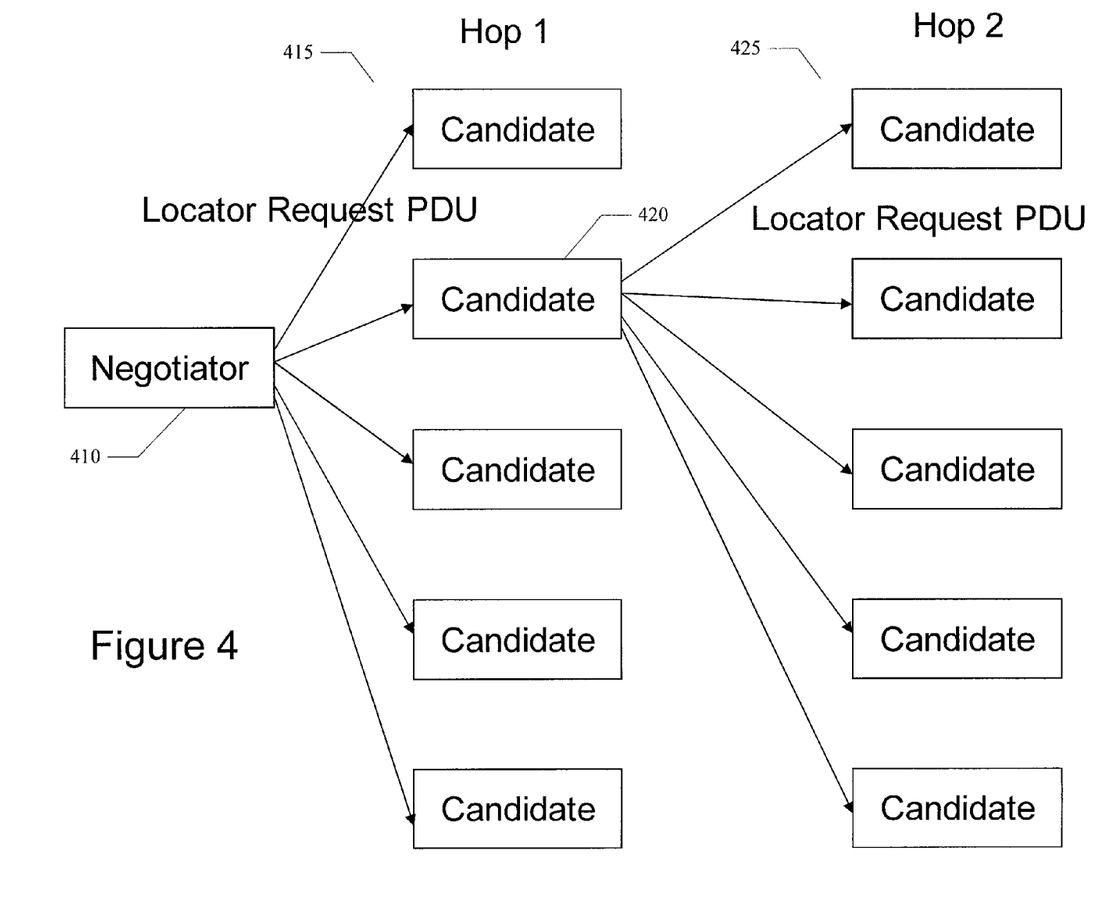
FIGS. 4-6 illustrate another example embodiment of the transactions between network elements to effect a configuration change.
Figure 5:
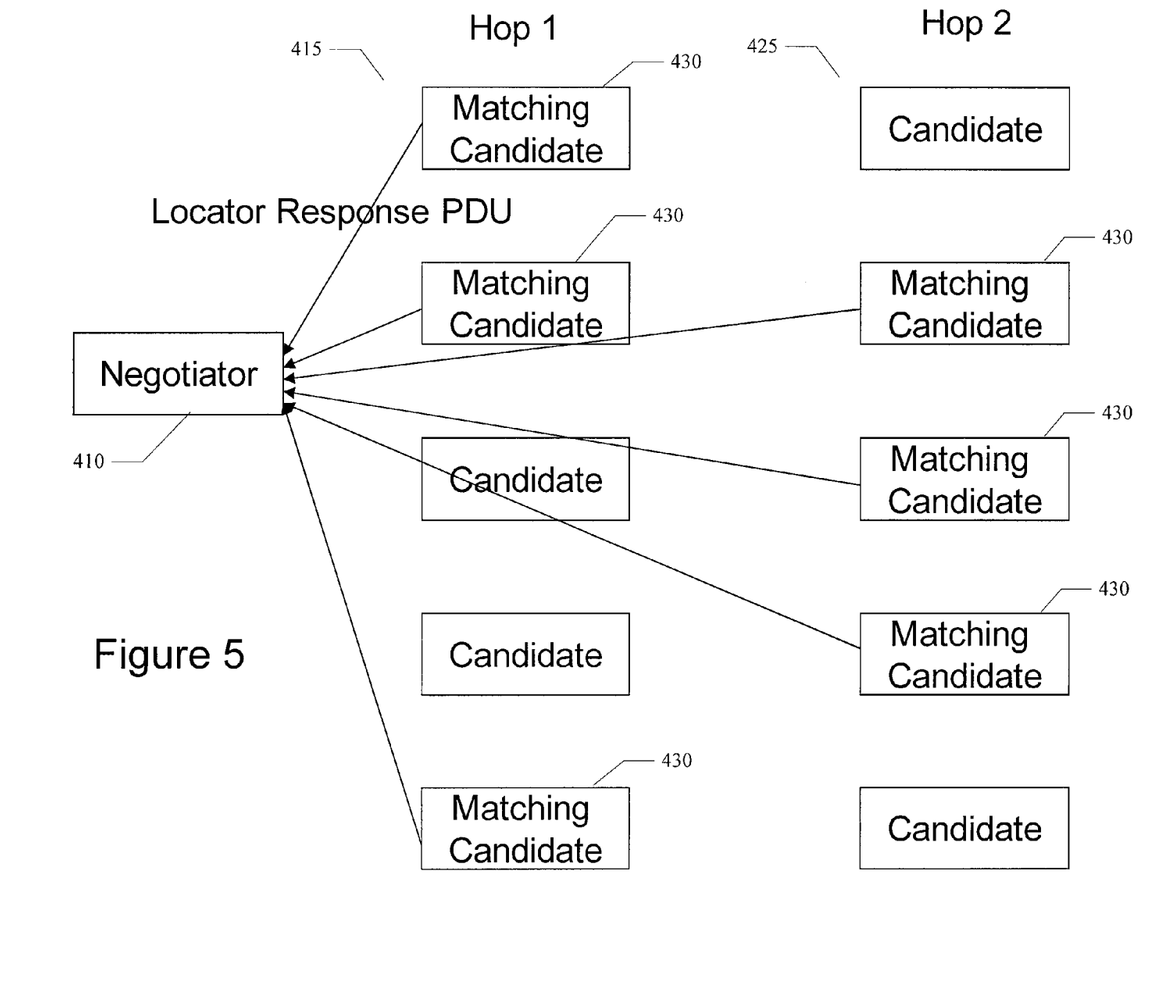
Figure 6:
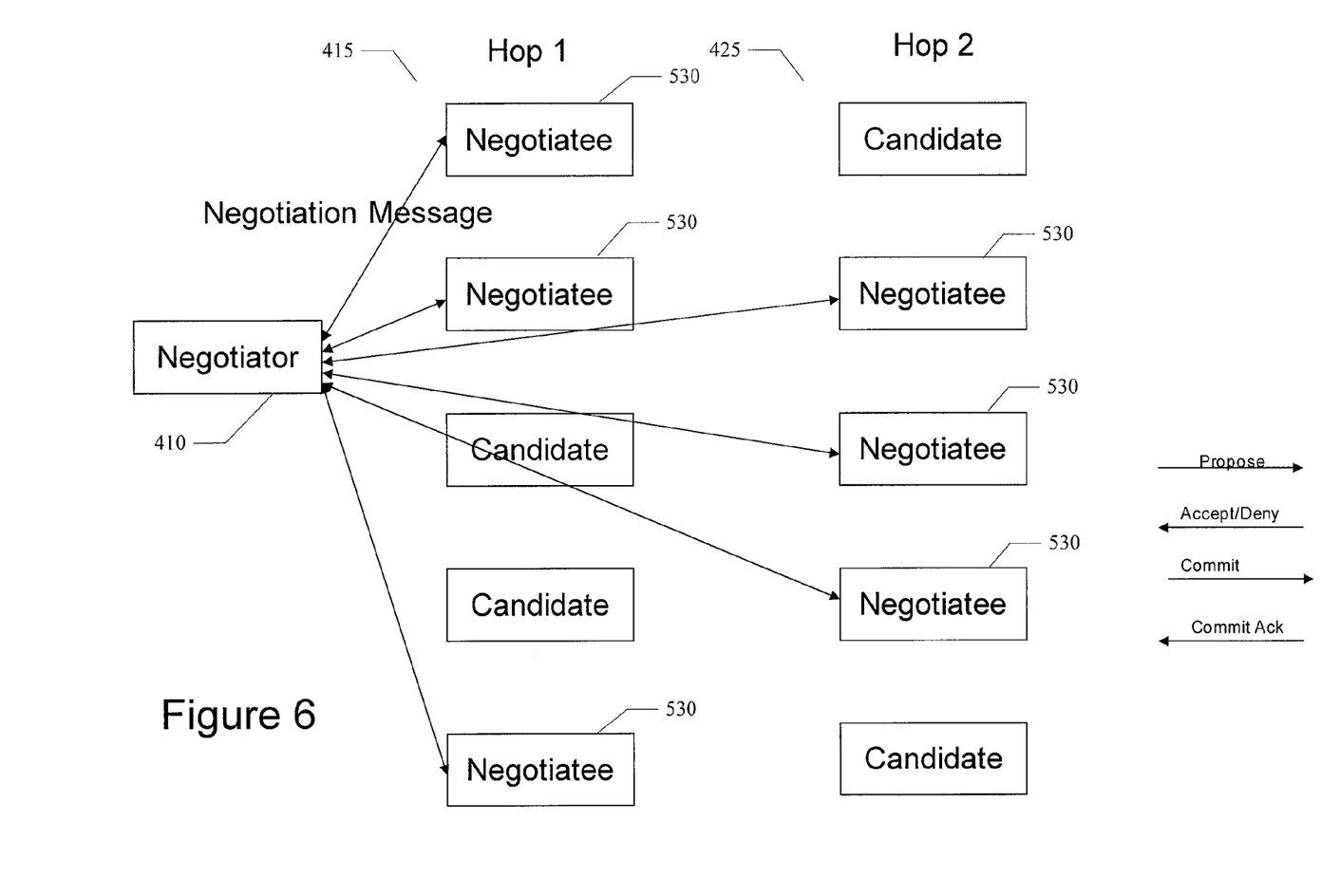

In the description of an example embodiment that follows and in reference to FIGS. 4-6, various terms are used to describe a particular example embodiment. These terms include Negotiator, Active Negotiator, Candidate, and Negotiatee. The network device that receives configuration changes on the first hand or decides to make changes to adjacent devices is termed as the Active Negotiator. Any network device can assume the role of the Active Negotiator. Alternatively, a specific set of devices in the network with additional memory and processing capacity can be chosen as the Active Negotiator for a particular configuration change. There can be several states associated with the neighbors of the Active Negotiator. A Candidate is a state in which a network device is ready to accept a configuration change from an Active Negotiator. If an Active Negotiator is not currently negotiating any changes with other network devices, then the device acting as Active Negotiator will be in the Candidate state. A Candidate (e.g., a network device acting in the Candidate state) can become a Negotiatee if the Candidate determines that it is within scope as determined by the network device's evaluation of the conditions in the scope challenge (e.g., address locator sent by NMS 105 in the first phase of the configuration change). In a particular embodiment, this scope challenge is denoted a locator request protocol data unit (Locator PDU). A Candidate can become a Negotiatee if the Candidate Locator PDU conditions evaluate to an in-scope condition. At any single point in time, the same network device can play the role of a Candidate for a specific configuration and actively negotiate another configuration. A Negotiatee is a network device that enters in to the negotiation phase with the Active Negotiator. The in-scope network devices remain in a Negotiatee state until a configuration change is committed (commit) or until any of various error conditions occur.

In a particular embodiment as described above, the entire network device configuration operation is split into two basic protocol transactions or phases. In a first protocol transaction (e.g., phase 1) implemented by a first phase module of an Active Negotiator or Candidate, the correct set of in-scope network devices for the negotiation is located or identified. In a second protocol transaction (e.g., phase 2) implemented by a second phase module of an Active Negotiator or Negotiatee, the negotiation devices of the in-scope set participate in an active negotiation for a configuration change and commit to the change. From the negotiatee's perspective, after responding to the Locator PDU, the Active Negotiator can respond to the Negotiatee within a pre-determined time. After locating the eligible Negotiatiees, a change negotiation can be started.

As shown in FIGS. 4 and 5, the first protocol transaction implemented by a first phase module involves addressing to multiple unknown peers with conditional criteria. This is achieved by using a Locator PDU sent by a Negotiator 410 using the well-known User Datagram Protocol (UDP) in a particular embodiment. The Locator PDU is sent to specific multicast addresses based on the type of eligible candidate network devices. As shown in FIG. 4, the Locator PDU can be sent to each Candidate network device 420 via one or more hops (e.g., hops 415 and 425) through a particular network. The conditional criteria in the Locator PDU can be evaluated by the receiving candidate network devices 420. When the criteria match is found or the conditional criteria evaluates to an in-scope condition, the in-scope Candidate network elements are eligible to become a Negotiatee. The in-scope Candidate network devices 430 then send out a response back to the Active Negotiator 410 as shown in FIG. 5.

Referring now to FIG. 6, the Active Negotiator 410 now enters the second phase of the configuration change protocol transaction using a second phase module. At this point, because of the first phase of the configuration change process described above, the identities of the in-scope network devices (now denoted Negotiatees) 530 are known to the Active Negotiator 410. Therefore, the Active Negotiator 410 can begin to negotiate the configuration change with the eligible Negotiatees 530. In a particular embodiment, this second phase transaction can be connection-oriented and can be implemented over the well-known transmission control protocol (TCP). The change negotiation can start with the Active Negotiator 410 proposing certain parameters and the set of values or value ranges for each of the parameters being configured/reconfigured. In reply, Negotiatees 530 can either accept or reject individual values or value ranges. As part of the reply, Negotiatees 530 can send back particular values as part of an acceptance response for the parameter, if a value range is specified. The Active Negotiator 410, based on various responses received from Negotiatees 530, can compute the actual values that need to be pushed to the Negotiatees 530. After computation, a commit proposal is sent to the Negotiatees 530 by the Active Negotiator 410. Optionally, as part of the commit proposal, the time to commit can also be set by the Active Negotiator 410. The time to commit determines the time after which the actual commit operation will happen. Time to commit should be in the range of seconds (typically less than 30 seconds) to achieve a single step reconfiguration of Negotiatees 530. As part of the commit proposal, Active NegotiatorActive Negotiator 410 can use the already negotiated and accepted values. When the commit proposal is received by the Negotiatees 530 and the values specified in the proposal are consistent with the previously accepted values, the Negotiatees 530 can send a commit-acknowledge reply with a commit. If a time to commit is specified, then after the commit is applied to the network device, a second committed-acknowledge is sent to the Active Negotiator 410. If not, the commit-acknowledge message also has a flag to indicate that the configuration is committed. Upon receiving a commit-acknowledge message, the Active Negotiator 410 can send an acknowledgement back to the Negotiatees 530 to indicate that the transaction is complete at both ends. In case of issues with committing the configuration to the network devices, the Active Negotiator 410 can roll back the configuration at this point. In a particular embodiment, a rejected value cannot be specified by the Active Negotiator 410 to try and force the Negotiatees 530 to get to the value. New parameters and values cannot be forced as part of commit directly without being specified as part of a negotiation transaction. In any of these cases, the Negotiatees 530 can flag a negotiation breach and can close the connection. One or more parameters can be dropped after negotiation during commit. However, if parameter A is dependent on parameter B then the Active Negotiator 410 cannot send a commit for parameter A dropping dependent parameter B as part of the commit. This is flagged as a dependency violation.

Using the various methods and techniques described herein, network devices can assume various roles as desired to effect a desired configuration for a particular network. For example, a particular network device can act as an Active Negotiator in one instance and a Negotiatee in another instance.

In the various embodiments described herein, network devices can use trust relationships to push a desired configuration to authorized network devices. Device identifiers of sender and receiver network devices can be used to validate the originator and receiver of a configuration message. Hashing, encryption, and validation against a trusted authority can also be used to validate a particular configuration change.

In a particular embodiment, it may be important to maintain synchronization of the configuration when new devices join or connected devices leave (become unavailable or fail) the network. In this case, the configuration in a multi-device context can have a renegotiate option where the user can specify if renegotiation is desired or not. When renegotiation is desired, a time interval can be configured for re-negotiation. At each time interval, a locator PDU can be initiated by the Active Negotiator. If there is a new network device or an existing network device is no longer available, then the configuration negotiation procedure as described above can start all over again. Because this periodic renegotiation may increase the processing overhead on the candidates, a message identifier can be used along with a source identifier to determine if the message was previously received by a network device. Condition evaluations can be cached in a network device. If a message was previously received and the hash code is found to be the same, then evaluation of the condition can be deferred and the previously cached condition evaluation result can be used instead.

Various embodiments described herein provide an apparatus and method for sharing a generic configuration across a group of network devices. Various embodiments provide an apparatus and method for sharing a generic configuration across a group of network devices data through trust relationships.

Figure 7:
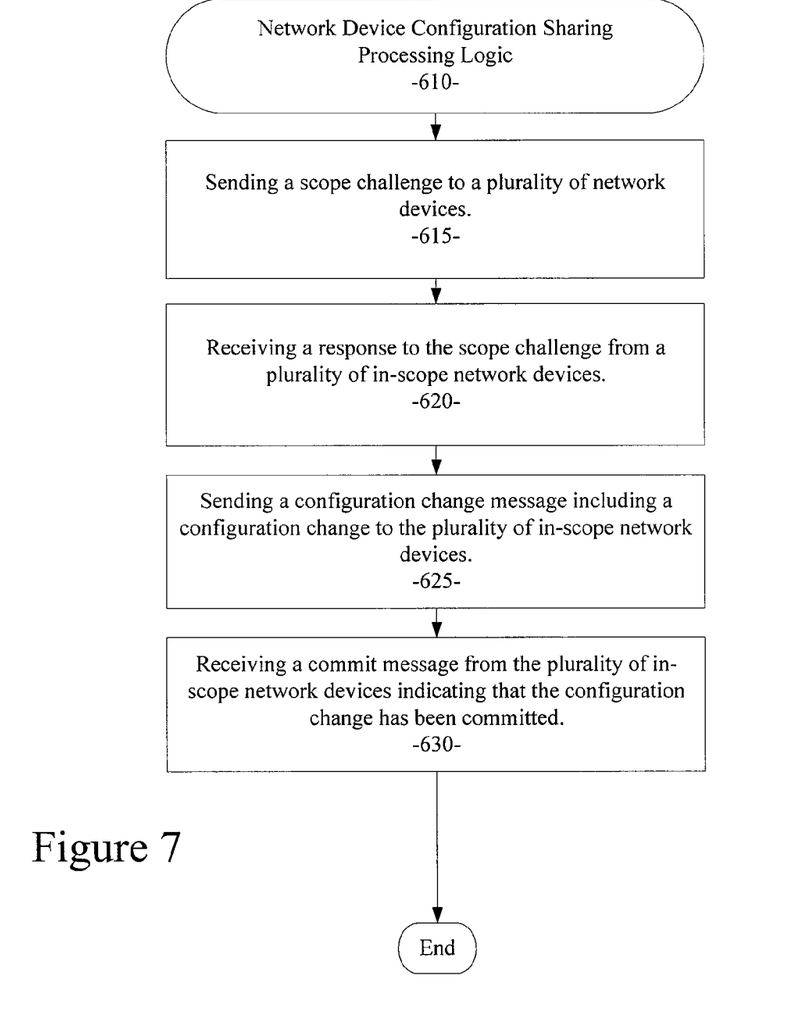
FIG. 7 is a flow diagram illustrating the processing flow for a particular example embodiment.

FIG. 7 illustrates a process flow diagram for another example embodiment. In the embodiment 610 shown, an apparatus and method for sharing a generic configuration across a group of network devices includes: sending a scope challenge to a plurality of network devices (processing block 615); receiving a response to the scope challenge from a plurality of in-scope network devices (processing block 620); sending a configuration change message including a configuration change to the plurality of in-scope network devices (processing block 625); and receiving a commit message from the plurality of in-scope network devices indicating that the configuration change has been committed (processing block 630).

Figure 8:
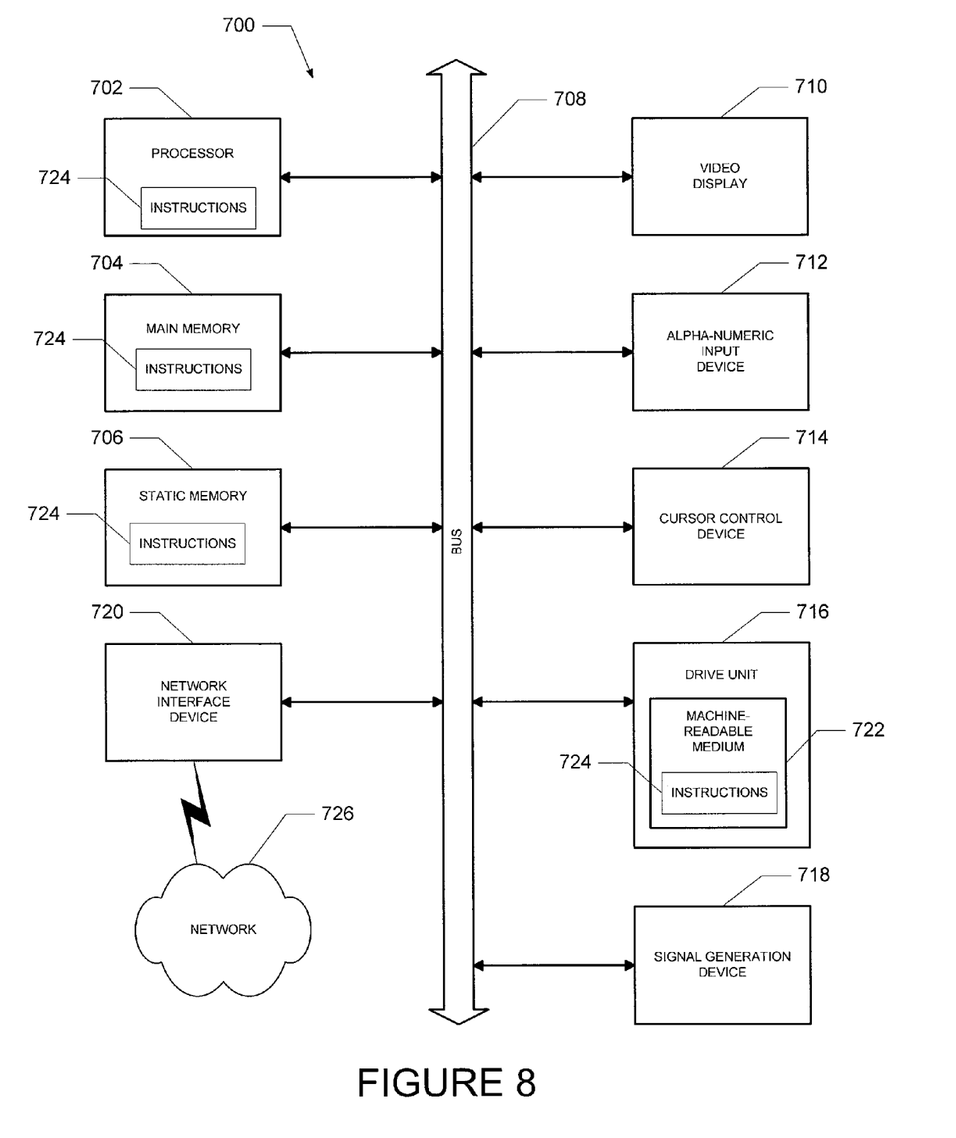
FIG. 8 illustrates an example of a computing system on which processing for various embodiments can be implemented.

FIG. 8 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Although the present specification describes components and functions implemented in the embodiments with reference to particular standards and protocols, the disclosed subject matter may be not limited to such standards and protocols. Each of the standards for Internet and other packet-switched network transmission (e.g., transmission control protocol (TCP) / Internet Protocol (IP) (TCP/IP), User Datagram Protocol (UDP)/Internet Protocol (IP) (UDP/IP), Hypertext Markup Language (HTML), and Hypertext Transfer Protocol (HTTP) represent examples of the state of the art. Such standards are periodically superseded by faster or more efficient equivalents having essentially the same functions. Accordingly, replacement standards and protocols having the same functions are considered equivalents.

Thus, as described above, an apparatus and method for sharing a generic configuration across a group of network devices is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

I claim:

1. A method comprising:
    sending a scope challenge to a plurality of network devices, wherein the scope challenge includes a set of one or more rules that can be evaluated by each of the plurality of network devices to determine if one or more conditions defining a scope of a configuration change are satisfied;
    receiving a response to the scope challenge from a plurality of in-scope network devices, the response including a determination that the corresponding network device is in-scope, wherein the determination is performed by the corresponding network device by evaluating at least one rule of the set of one or more rules;
    sending a configuration change message including a configuration change to the plurality of in-scope network devices; and
    receiving a commit message from the plurality of in-scope network devices indicating that the configuration change has been committed.

2. The method as claimed in claim 1, wherein the response to the scope challenge includes an identity of a responding network device.

3. The method as claimed in claim 1, including negotiating the configuration change with in-scope network devices.

4. The method as claimed in claim 1, wherein the scope challenge is sent to the plurality of network devices via multiple hops.

5. A method comprising:
    receiving a scope challenge from an Active Negotiator, the scope challenge including a set of one or more rules that can be evaluated to determine if one or more conditions defining a scope of a configuration change are satisfied;
    evaluating the set of one or more rules to determine if a network device is within the scope of the configuration change;
    sending a response to the Active Negotiator, the response indicating that the network device is an in-scope network device;
    receiving a configuration change message including the configuration change from the Active Negotiator; and
    sending a commit message to the Active Negotiator indicating that the configuration change has been committed.

6. The method as claimed in claim 5, wherein the response to the Active Negotiator is sent in a unicast message.

7. The method as claimed in claim 5, wherein the response to the Active Negotiator includes an identity of a responding network device.

8. The method as claimed in claim 5, including negotiating the configuration change with the Active Negotiator.

9. The method as claimed in claim 5, wherein the scope challenge is received after multiple hops.

10. An Active Negotiator network device comprising:
    a data processor;
    a memory in data communication with the data processor;
    a first module being configured by use of the data processor to send a scope challenge to a plurality of network devices, wherein the scope challenge includes a set of one or more rules that can be evaluated by each of the plurality of network devices to determine if one or more conditions defining a scope of a configuration change are satisfied, the first module being further configured to receive a response to the scope challenge from a plurality of in-scope network devices, the response including a determination that a corresponding network device is in-scope, wherein the determination is performed by the corresponding network device by evaluating at least one rule of the set of one or more rules; and a second module being configured to send a configuration change message including a configuration change to the plurality of in-scope network devices, and to receive a commit message from the plurality of in-scope network devices indicating that the configuration change has been committed.

11. The Active Negotiator network device as claimed in claim 10, wherein the response to the scope challenge includes an identity of a responding network device.

12. The Active Negotiator network device as claimed in claim 10, including negotiating the configuration change with in-scope network devices.

13. The Active Negotiator network device as claimed in claim 10, wherein the scope challenge is sent to the plurality of network devices via multiple hops.

14. A Negotiatee network device comprising:
a data processor;
a memory in data communication with the data processor;
a first module being configured by use of the data processor to receive a scope challenge from an Active Negotiator, the scope challenge including a set of one or more rules that can be evaluated by the Negotiatee device to determine if a set of one or more conditions defining a scope of a configuration change are satisfied, the first module being further configured to evaluate at least one rule of the set of one or more rules to determine if a network device is within the scope of the configuration change, and to send a response to the Active Negotiator, the response indicating that the network device is an in-scope network device; and a second module being configured to receive a configuration change message including a configuration change from the Active Negotiator, and to send a commit message to the Active Negotiator indicating that the configuration change has been committed.

15. The Negotiatee network device as claimed in claim 14, wherein the response to the Active Negotiator is sent in a unicast message.

16. The Negotiatee network device as claimed in claim 14, wherein the response to the Active Negotiator includes an identity of a responding network device.

17. The Negotiatee network device as claimed in claim 14, including negotiating the configuration change with the Active Negotiator.

18. The Negotiatee network device as claimed in claim 14, wherein the scope challenge is received after multiple hops.

\* \* \* \* \*